Sept. 20, 1966  R. L. SMALL ET AL  3,273,985
PRODUCTION OF FIBER GLASS STRAND
Filed March 1, 1962  4 Sheets-Sheet 1

INVENTORS
RUSSELL L. SMALL and
WARREN W. DRUMMOND
BY
Oscar H. Spencer
ATTORNEY

Sept. 20, 1966  R. L. SMALL ET AL  3,273,985
PRODUCTION OF FIBER GLASS STRAND
Filed March 1, 1962  4 Sheets-Sheet 2

INVENTORS
RUSSELL L. SMALL and
WARREN W. DRUMMOND
BY
Oscar L. Spencer
ATTORNEY

Sept. 20, 1966  R. L. SMALL ET AL  3,273,985
PRODUCTION OF FIBER GLASS STRAND
Filed March 1, 1962  4 Sheets-Sheet 4

INVENTORS
RUSSELL L. SMALL and
WARREN W. DRUMMOND
BY Oscar Spencer
ATTORNEY 3,273,985
PRODUCTION OF FIBER GLASS STRAND
Russell L. Small, Pittsburgh, and Warren W. Drummond, Allison Park, Pa., assignors to Pittsburgh Plate Glass Company, Pittsburgh, Pa., a corporation of Pennsylvania
Filed Mar. 1, 1962, Ser. No. 176,734
2 Claims. (Cl. 65—2)

This invention relates to the manufacture of fiber glass in the form of strands and particularly to a process and apparatus for producing a fiber glass strand of substantially uniform diameter fibers and packaged in such a manner that the tension on the strand as it is being wound on a forming tube is relatively low and within a predetermined range.

Fiber glass strands are produced by flowing streams of glass through orifices in a bushing containing a portion of a glass melt and attenuating the streams into small diameter fibers. A size is applied to the fibers and thereafter they are gathered into a strand and collected onto a package. A traversing mechanism is used for distributing the strand in a predetermined fashion over the package.

In the present method of producing a stand, a package, commonly known as a forming package, is driven on a collet at a constant angular velocity and the force applied to the strand by the rotating package is the primary attenuating force for the fibers. It can thus be understood that as a package is wound, the diameter of the package increases and thus the lineal drawing speed of the fiber is increased, so that the diameter of the fibers is constantly decreased. To compensate for this variation in fiber diameter, it has been proposed to increase the temperature of the glass in the bushing and thus vary the viscosity of the glass which in turn increases the flow rate of the molten glass to compensate for speed changes. This, however, can only achieve an approximation of a constant diameter fiber because the temperature of the glass in the bushing can practically be varied only in a linear fashion, and the lineal speed of draw, which is directly related to the angular velocity times circumference, does not vary linearly, but is in fact exponential.

In addition to the speed changes applied to the fibers mentioned above, the traverse imparts additional speed changes which affect the production of a uniform fiber and thus a uniform strand. The traversing action of the strand tends to introduce instantaneous variations in the lineal drawing speed, resulting in instantaneous yardage variations commonly referred to as short-term yardage variations. One common type of traverse is shown in U.S. Patent No. 2,391,870. This traverse changes the plane through which the strand is moved during traversing. Also, the traverse is reciprocated axially relative to the forming package so as to distribute the strand along the length of the forming package. The additional forces which are exerted to displace the strand from its natural plane and distribute it throughout the length of the forming package result in speed changes of the attenuated fibers.

The shape of the forming package also contributes to the noncontinuous variations in lineal speed of draw and affects the uniformity of the fiber and thus the strand. The conventional forming package is wound to have a barrel-like shape with tapered ends so that, as the strand is traversed off the central portion of this package and down along the tapered ends, it experiences a change in lineal speed because the package angular velocity is constant.

In addition to the winding and attenuating forces of the forming package and the force exerted by the traversing mechanism, the gathering shoe and the size applicator exert additional forces on the strand because of their placement with respect to the plane of the natural draw of the fibers. All these forces introduce tensions into the fiber and the tensions so introduced are additive and retained in the strand as it is being wound onto the forming package.

These additive tensions mentioned above result in each layer of glass fiber being wound on the package at a tension sufficient to cause elongation or stretching of the frozen strand. This elastic-type stress actively constricts all layers previously wound and eventually causes them to crumple and kink. Crumpling and kinking of the inner layers causes permanent damage to the fibers and reduces the quantity and quality of usable yardage on the package. These high tensions also make it necessary to use a collapsible winding mandrel so as to be able to remove the wound package.

The present invention teaches the concept, in the continuous strand process, of drawing the strand at a substantially constant attenuating speed and then winding the drawn strand onto a package at a tension much reduced from that tension due to the drawing operation. The strand will be wound on the package with a substantially uniform low tension or a gradually decreasing low tension. In either case, the low tension will be within a predetermined range of values. The strand is preferably wound on the forming tube in a series of successive superposed, parallel cylindrical layers so as to form a so-called flat sided package. Each successive layer is preferably shorter than the preceding layer so as to minimize variations in effective wind-up tension on the strand such as may be caused by the strand being wound on a barrel-shaped forming package as described above.

U.S. Patent No. 2,719,350 shows pulling a glass strand at constant speed, as is demonstrated by use of pulling wheels for attenuating a strand and collecting the strand on a rotating pinwheel in looped form to produce spun roving. However, the problems involved in winding a fiber strand onto a forming tube as a package are not present in the prior art as just described. No successful attempt, prior to the present invention, has ever been made to draw a glass strand at a constant speed and at a specified tension and wind the same in the manner to be hereinafter described.

More specifically, apparatus for performing the method of the present invention includes a constant angular velocity motor driving one or more pulling wheels or other constant speed pulling means to attenuate the glass fibers and a high, variable speed motor to drive the winding collet and thus the forming tube and package onto which the strand is collected. The collet motor can be a motor having either a virtually constant torque or a virtually constant horsepower characteristic. The collet has a relatively small diameter and presents a continuous solid, cylindrical surface as contrasted to the collapsible collet of the prior art. A traverse distributes the strand as it is wound on the forming tube and suitable means are provided to reciprocate the forming package and traverse relative to each other to build up the package in a series of superposed parallel, cylindrical layers on the forming tube.

The advantages obtained by employing the present invention include the long sought after uniform yardage fiber glass strand and, in addition, many other new, useful and unobvious results.

The strand produced according to the present invention is virtually free of both long and short-term yardage variations, i.e., fiber diameter variations caused by many variables affecting the fiber drawing speed. As indicated above, yardage variation has been attributed largely to variations in the lineal speed of draw of the fiber. In the present invention, a separate take-up device is provided, so that the strand is not wound about the pulling means driven by the constant angular velocity pulling motor. However, because the pulling means is driven by the constant angular velocity motor, the strand is drawn at a constant lineal speed and at a speed coordinated with a bushing temperature and glass temperature chosen to insure maximum efficiency in production Operation of the bushing at a single temperature rather than a constantly varying temperature permits better operation of the bushing. One or more capstans have been found to perform the pulling function and are simple to drive because of direct connections to the motor shaft. The attenuating force exerted on the strand and thus the fibers is constant because the forces exerted by the pulling means, by the size applicator and by the gathering shoe are virtually constant. The constant lineal speed of draw means uniform fiber yardage and thus uniform strand yardage.

Operationally subsequent to the drawing operation is the take-up operation including the driven forming package and its accompanying traverse. The take-up or collet motor is designed to remove the strand from the pulling means at a reduced tension when compared with that tension applied to draw the fibers. The take-up motor winds only so much of the strand as is "fed" to it from the pulling means while exerting a tension on the strand, as it travels between the pulling means and the collet, which is less than the tension applied to the fibers during attenuation by the pulling means. The particular tension desired may be selected by adjusting the input voltage of the collet motor which acts to adjust the operational torque or power level. Once this voltage is selected, it need not be changed during the strand forming run. The collet motor requires no programming since it automatically programs itself.

The collet motor is preferably a high-speed, i.e., on the order of 10,000 to 25,000 r.p.m., variable-speed, direct-drive induction motor. It can be a substantially constant torque type motor such that the tension on the strand as it is being collected onto the package constantly decreases or it can be a substantially constant horsepower type motor such that a substantially uniform tension is applied to the strand as it is collected onto the package. The collet and collet motor are preferably reciprocated in an axial direction during the strand forming run in order to distribute the strand on the forming package in a series of superposed, parallel, cylindrical layers.

In addition to producing fiber glass yarn free of cyclic yardage variation, either short or long term, the apparatus of the present invention produces a fiber glass forming package, the glass strands of which are wound at a tension much less than was heretofore possible. The greatly reduced tensions in the forming package are possible because all of the tension placed in the strand by the attenuating force, the binder applicator force and the force due to the gathering shoe are isolated from the forming package. The only tension present in the strand wound about the forming package is that desired tension required to take the strand from the pulling means and wind it around the forming tube. This marked reduction in the strand tension of the forming package is most noticeable when the hardness of the wound package of the present invention is compared with a package wound by prior art methods. The hardness of the package is directly indicative of the tension of the strand in the forming package as well as in the strand as it is being wound. The higher the strand tension, the harder the package.

The reduced tension in the strand making up the package permits the production of a much larger forming package than was heretofore attainable. The prior art winding methods discussed above wound the strand about the package at an initially high and ever increasing tension. Each layer of fiber glass strand exerted a large constricting force on the package and on all layers of the strand wound thereunder. These forces become so great in a conventional 3 or 4 pound package of about 6 inches in length wound on a forming tube of approximately 6 inches in diameter and 8½ inches in length that the supporting tube at least partially collapses and distorts, the wound strand correspondingly collapses, kinks and distorts resulting in a forming package from which only a portion of strand may be removed for further processing or in a rejectable, and therefore wasted, forming package.

When the strand is drawn and wound according to the present invention, there are no large forces sufficiently great to distort the forming package nor do the different layers of the fiber glass strand exert damaging constricting forces on one another. The tensions of the strand are either uniform or decreasing from inner to outer layers on the package so that only slight constricting forces are present.

In the prior methods of winding fiber glass strands, the forming tube had a relatively large diameter, e.g., in excess of 6 inches and up to about 12 inches in diameter. The use of such large diameter forming tubes results in smaller linear speed variations from the inside to the outside of the package for any given strand yardage, and tends to reduce yardage variation. The larger package, however, is more susceptible to collapse and deformation, is more expensive and requires a larger and more powerful driving motor. The tube and the final forming package are bulky items to handle and expensive to ship and, as a result, are considered non-shippable. In addition, they are not practically stored due to the large, useless air space encompassed by the package or tube.

The apparatus of the present invention permits the utilization of a forming tube of much smaller diameter, for example, one having a diameter of 2 to 5½ inches, preferably about 3 inches. The quantity of strand that can be wound on small diameter forming tubes without any tendency of tube or fiber to deform is materially above that previously packaged on larger diameter forming tubes by the method of the prior art. Use of smaller diameter forming tubes also permits faster starting and stopping of the collet motor with less wear and tear on mechanical parts due to the lower inertia forces which are dealt with.

It is desirable from a storage consideration to store the maximum fiber yardage in the least space. Of course, consideration must be given to the particular package with respect to further processing, such as twisting and plying. The forming package which can be produced by the present invention is capable of containing and storing three to four or more times the amount of fiber glass strand in the same volume as a forming package, the strand of which is drawn and wound in accordance with present commercial methods. Such a package is, of course, much less expensive to ship. Also, due to the smaller tube diameter, less factory space is required in further processing operations utilizing the novel forming package.

The reduced tension winding operation materially reduces the possibility of strand breakage during winding. Additionally, the removal of the strand in a subsequent unwinding operation is much easier with a minimum of surface abrasion between adjacent portions of the strand, due to the "not so tightly wound" strand. The latter is particularly true in a package of a strand of decreasing tension. Because of the "soft" package, i.e., reduced tension on the strand, further processing such as conventional uptwisting, two for one twisting and direct rewinding for quilling, warping and other purposes, can be easily achieved.

The problems of kinking and package failure involved in winding at the high tensions required in the prior art methods, hereinabove alluded to, arise when only approximately a ½ inch shell or wall thickness of strand forming package is wound about the forming tube. In the method of the present invention there is no physical limit for the wall thickness, wall thicknesses of 2 or more inches not being uncommon.

Illustrative embodiments of the invention will be described in detail with reference to the accompanying drawings wherein.

Figure 1:
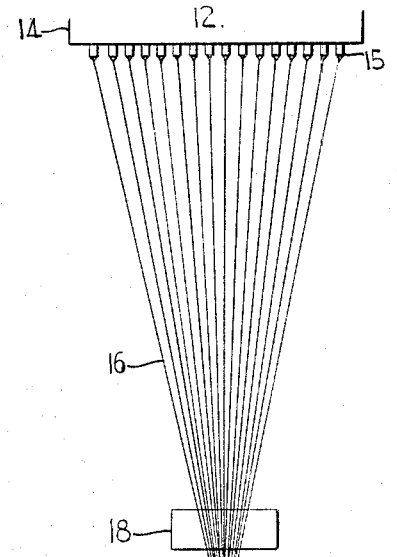
FIGS. 1 and 1a are schematic representations of one embodiment of the forming, drawing, and winding operation of the present invention.
Figure 1A:
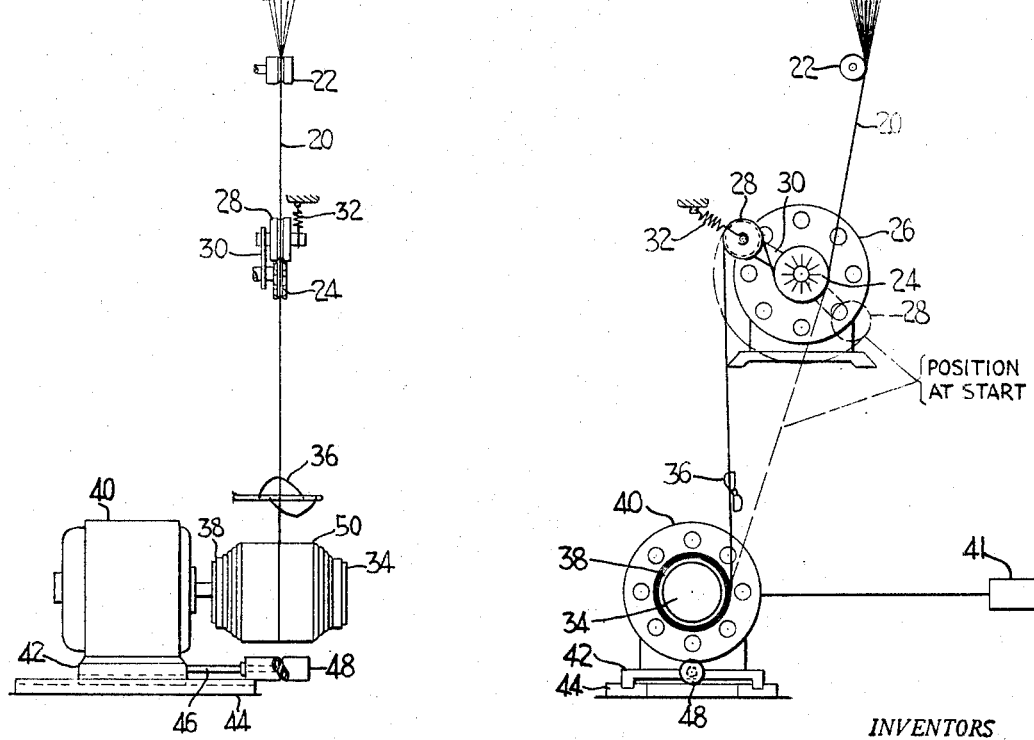

In FIG. 1, there is illustrated a melting tank 12 and a bushing 14 having a plurality of closely spaced tips 15 from which glass flows as streams and is attenuated to form glass fibers 16. A suitable size is applied to the fibers 16 by a size applicator 18 of conventional design. The fibers 16 are gathered into a strand 20 by a conventional gathering shoe 22. The strand is drawn by a capstan pulling wheel 24 driven by a constant angular velocity motor 26 connected to a suitable power source (not shown).

The constant angular velocity motor 26 can be a synchronous motor or an induction motor with less than 1 percent slip at full load torque. The motor, if an induction type, is chosen so that the operational torque is only a small percentage of full load torque and the motor acts essentially as a synchronous motor, giving substantially uniform speed, i.e., not varying by more than ±3 percent, to the pulling capstan 24.

The pulling device 24 of the illustrated embodiment is a capstan type feed reel commonly used in the textile industries. It must be recognized that other types of pulling devices can be used, for example, V groove pulling type wheels, single and double godet wheels, a plurality of driven capstan wheels, or a simple pair of pulling wheels of known art construction. The illustrated capstan wheel is preferred because it provides a positive grip on the strand with a minimum of contact even at low strand tension and, in addition, it releases the strand readily and causes little or no strand damage.

An idler wheel or dancer 28 is rotatably mounted on an arm 30, pivotally mounted about the axis of rotation of the capstan puller 24. A spring 32 resiliently supports the wheel 28 in its operating position. The spring biased idler wheel maintains the strand 20 around a portion of the capstan 24, taking up any slack in the strand from the capstan 24 to the collet 34, and absorbing the initial engagement shock and all subsequent operational shocks.

The strand 20 passes over the idler wheel 28 towards the collet 34. A traverse mechanism 36 is provided to lay the strand 20 onto a forming tube 38 in a slightly crossing relation to permit ease of unwinding. The traversing device 36 is a standard wire loop traverse. Any other type of traversing mechanism may be employed, for example, the air motor traverse described and claimed in United States application of Adrien R. La Casse entitled "Method and Apparatus for Imparting Reciprocatory Motion," Serial Number 78,178, filed December 23, 1960 now Patent No. 3,118,628 issued January 21, 1964.

The strand is collected onto the forming tube 38 which is frictionally received over the collet 34 which is driven by a motor 40. The motor 40 may be a constant torque motor or a constant horsepower motor and is connected to a suitable source of power (not shown) through a power varying means 41, such as a "Variac," to permit variation in the magnitude of the input voltage to the motor's stator winding. The collet is directly connected to the shaft of the motor 40 and is rotatable at relatively high speeds, for example, on the order of 14,000 r.p.m.

The collet 34 and motor 40 are mounted on a base 42 which is continuously reciprocated throughout the forming run on rails 44 in a direction parallel to the axis of the collet by means of a piston 46 mounted in cylinder 48 and attached to base 42. The length of reciprocation of the base 42 is successively shortened as each layer is formed. This is accomplished by suitable cams and poppet valves (not shown) such as are described and shown in detail in copending application Serial No. 156,089, filed November 30, 1961 now abandoned. It is understood, of course, that the traverse can be reciprocated axially rather than the collet, or both the collet and traverse can be reciprocated in opposite directions to each other to distribute the strand on the forming package. The strand 20 is thus collected onto the forming tube and builds up on the forming tube in a series of superposed, parallel, cylindrical layers of successively shorter lengths to form a multi-layered forming package 50 such as shown in FIG. 1.

Figure 2:
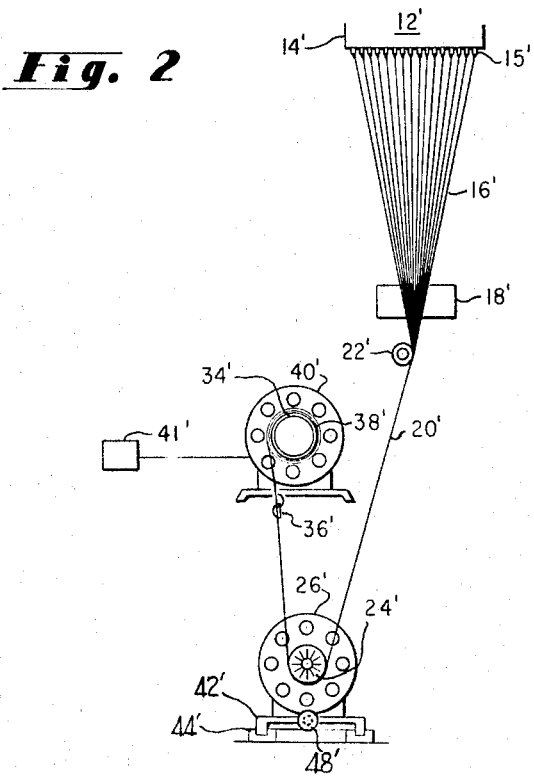
FIG. 2 is a schematic representation of a second embodiment of the forming, drawing and winding operation of the present invention.

A second embodiment of the present invention, shown in FIG. 2, alleviates the necessity of having an idler wheel or other similar device to insure engagement of the strand with the capstan puller. In FIG. 2, the melting tank 12', bushing 14', tips 15', fibers 16', size applicator 18', strand 20', gathering shoe 22', wheel 24', motor 26', collet 34', traverse 36', forming tube 38', motor 40', power varying means 41', base 42', rails 44' and cylinder 48' are all identical to the corresponding elements of FIG. 1. Likewise, the collet 34', forming tube 38' and motor 40' are reciprocated relative to traverse 36' in the same manner as described above with respect to the corresponding elements in FIG. 1. The difference rests in the change in location of the constant angular velocity motor 26' (and thus the capstant 24'), the traverse 36' and the winding motor 40'.

The pulling motor 26' is disposed below the take-up motor 40' so that the strand 20' is naturally engaged by the capstan 24' during the drawing and winding operation without the use of a separate engaging device, such as the idler wheel 28. Thus, the strand 20' is drawn at a constant lineal speed and then wound about the forming tube 38' on the collet 34' of take-up motor 40', the traverse 36' laying the strand 20' onto the forming tube 38' in the same manner as shown in FIG. 1.

The motors employed as the motor 40 or 40' in the described embodiments are preferably 2-pole, 3-phase, 240 cycles per second A.C. squirrel-cage induction motors. More specifically, they are varying speed motors having large slip, e.g. 10 percent or more slip, and capable of developing either substantially constant torque or constant power at all operational speeds depending upon the specific type of motor used, i.e., constant torque or constant horsepower.

As a substitute for the squirrel-cage induction motor, a wound rotor induction motor, or a D.C. motor with proper control can be used if they are designed to develop the characteristics required at the high but variable operating speed.

As is well known in induction motors, the synchronous speed is fixed by the supply frequency and the number of poles in the motor. The synchronous speed is the speed of rotation of the magnetic field. The actual speed of rotation of the rotor is somewhat less than synchronous speed even at no load. As an increasing load is introduced to the rotor shaft, the rotational speed of the shaft decreases and therefore the differential between rotor speed and synchronous speed increases. This increase in the relative motion between the magnetic field and the rotor windings increases the rate at which the magnetic flux is cut by the rotor windings and induces a higher voltage in the rotor windings and thus an increase in rotor current and power output. The reduction in speed continues until the torque developed at the rotor shaft is adequate to compensate for the increase in load by an amount determined by the motor construction. The difference between the synchronous speed and the actual speed of the rotor is known as the "slip."

A constant torque motor is one in which the product of the developed power and the inverse of the rotational speed of the rotor is constant as the speed of the rotor varies.

A constant horsepower motor is one in which the product of the torque and the rotational speed of the rotor is constant as the speed varies.

The constant torque motor described above, and any other motor designed with the same operational characteristics, acts on the fiber glass strand as follows. As the formed package builds up, the load is of course increasing, due to both the mass buildup and the increased torque arm of the strand tension which is a force resisting rotation. The increased load causes the rotational speed to decrease, maintaining the linear speed of wind constant. The decrease in angular velocity causes the slip to increase. An increase in slip results in the decrease of the rotational power output at the collet. The decreased power at the collet corresponds to the decreased speed to give constant torque operation, and thus the strand is wound at an ever decreasing tension, the speed of lineal wind remaining constant.

The constant-horsepower motor described above and any other motor designed with the same operational characteristics, acts on the fiber glass strand as follows. As the forming package builds up, the load is of course increasing, due to both the mass buildup and the increased torque arm of the strand tension which is a force resisting rotation. The increased load causes the rotational speed to decrease, maintaining the linear speed of wind constant. The decrease in angular velocity causes the slip to increase. An increase in slip increases the torque at the collet. The increased torque at the collet compensates for the increased load and thus the strand is wound at a uniform tension, the speed of lineal wind remaining constant, and thus constant-horsepower operation.

The large slip in both the constant torque and the constant-horsepower motors described above and usable in this invention causes both motors to decrease in speed from about 11,500 r.p.m. at start-up down to approximately 6,500 r.p.m. at the finish of a wind.

Figure 3:
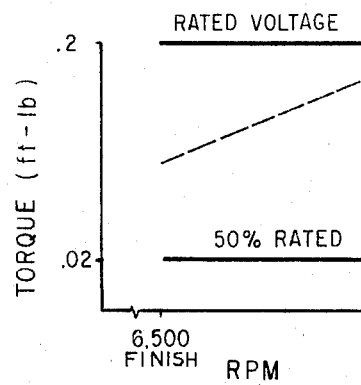
FIG. 3 represents operational portions of the speed-torque curves of a constant torque take-up motor at various magnitudes of input voltage and the relation thereto of the tension in the strand as it is being collected.

FIG. 3 reveals a family of operational portions of the speed-torque curves of a constant torque motor usable as the motor 40 or 40'. The curves indicate that the magnitude of the torque for any given value of input voltage is a constant over a wide range of speed variation, such as is encountered in this described process. The torque level determines the tension at which the strand is wound. The dashed line represents graphically that the tension in the strand between the capstan 24 and the collet 34 constantly decreases during the winding operation.

Figure 4:
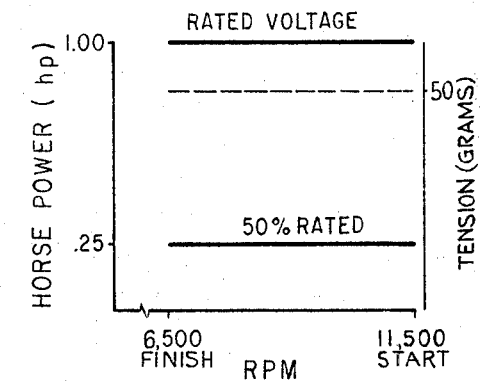
FIG. 4 is a curve similar to that shown as FIG. 3 showing operational portions of the speed-horsepower curves of a constant horsepower take-up motor at various magnitudes of input voltage and the relation thereto of the tension in the strand as it is being collected.

FIG. 4 reveals a family of operational portions of the speed power curves of the constant horsepower motor usable as motor 40 or 40'. The curves indicate that the magnitude of horsepower obtainable is dependent upon the input voltage to the motor. The magnitude of the horsepower for any given value of input voltage is a constant over a wide range of speed variation. The power level determines the tension at which the strand is wound. The dashed line in FIG. 4 graphically illustrates that the tension in the strand between capstan 24 and collet 34 remains constant throughout the winding operation.

In the starting operation of the embodiment of FIG. 1, the drawing and winding process is begun in the conventional manner. The operator starts the wind on the forming collet 34. However, after a short delay the puller motor 26 is started. The spring-biased idler wheel 28 is rotated in clockwise manner as shown in FIG. 1 around the capstan 24 thereby easing the strand 20 into engagement with the capstan. The motor 40 at this point automatically, by virtue of its high slip, adjusts the peripheral speed of the collet 34 to the linear speed imparted to the strand 20 by the capstan 26. The collet speed continually decreases during the winding operation due to the force exerted upon it by the strand 20. The motor 40, either a constant-torque or a constant-horsepower motor, drives the collet which collects the strand as previously explained.

In the operation of the embodiment disclosed in FIG. 2, the operator loops the strand 20' over both the capstan 24', of the pulling motor 26', and the collet 34', of the take-up motor 40'. The motors 26' and 40' are started simultaneously. The slip in motor 40' adjusts the peripheral speed of the collet 34' to the linear speed imparted to the strand 20' by the capstan 26'. The collet speed of rotation continually decreases during the winding operation due to the force exerted upon it by the strand 20'. As stated hereinbefore, all the elements utilized in the second embodiment are identical to those used in the first embodiment. Therefore, the motor 40' may be either a constant-torque motor or a constant-horsepower motor.

Figure 5:
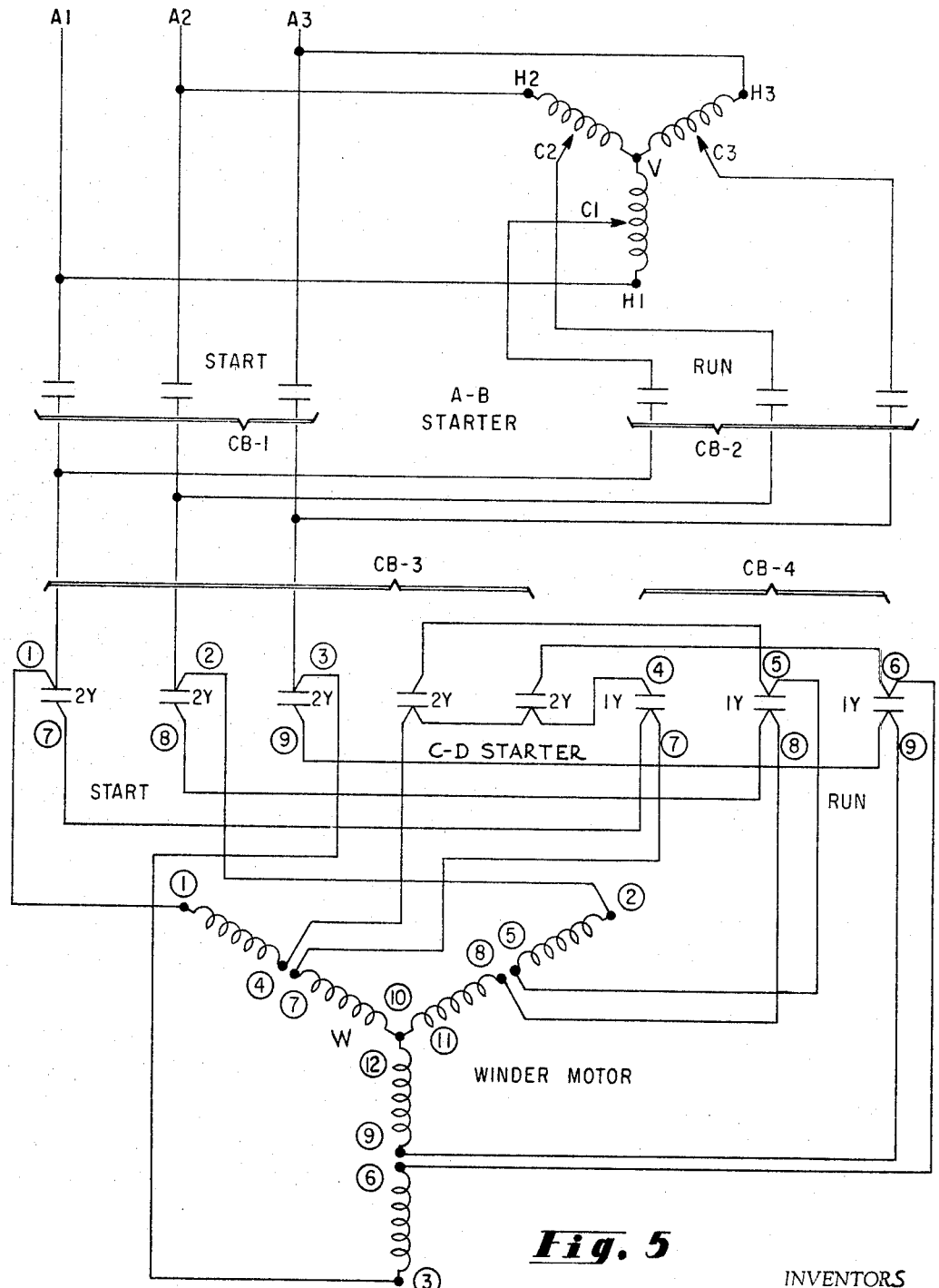
FIGS. 5, 6 and 7 are wiring diagrams for the start-up circuits usable with the constant torque motor.
Figure 7:
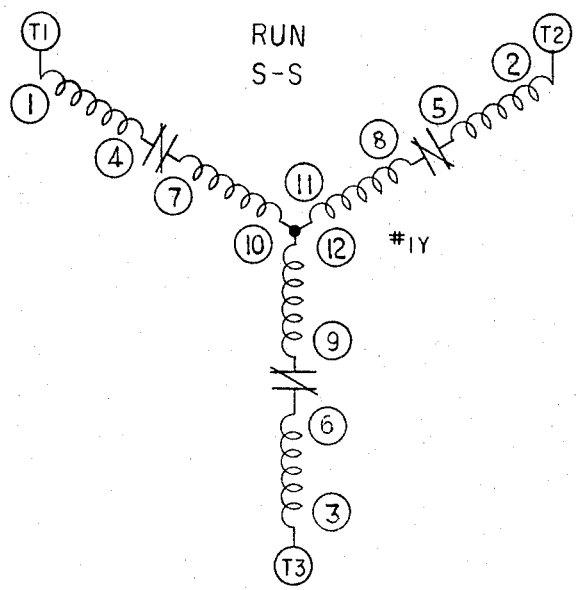
Figure 6:
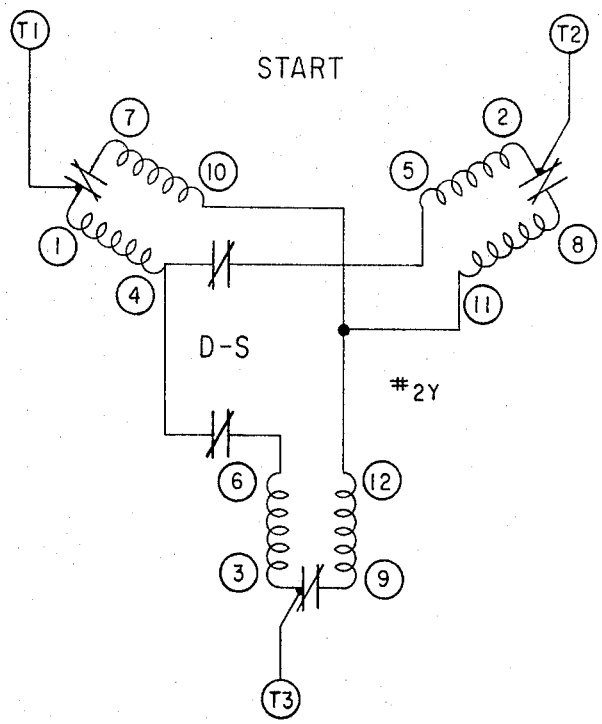

The constant-torque motor usable as the motor 40 or 40' requires a special start-up circuit. The constant-torque motor is energized with a high voltage across each of its stator windings in order to develop the initial high torque required for start-up and a lower continuously selective variable voltage for obtaining the running torque. As indicated in FIG. 3, the torque level of the motor is determined by the input voltage to the motor, so that switching from one voltage to another voltage is required for the desired operational characteristics. Switching from initial starting voltage to running voltage is accomplished automatically on a time delay basis and at the time of switching from one voltage to another voltage, the connections of the motor windings are changed. The starting and switching circuit is illustrated in FIG. 5. FIGS. 6 and 7 show schematically the starting and running motor winding connections of the circuit illustrated in FIG. 5.

The winder motor is run from a multi-phase power supply illustrated as three phases, A1, A2 and A3, for example, of 220 volts. The starter identified as A–B and the multi-speed starter identified as C–D control the winder motor 40 or 40'. The starter A–B is designated "Start" side and "Run" side, and the multi-speed starter C–D is designated 2Y–"Start" and 1Y–"Run." Circuit breakers CB–1 and CB–3 are ganged to operate simultaneously, as are circuit breakers CB–2 and CB–4.

To start the winder motor, CB–1 and CB–3 are closed, CB–2 and CB–4 are opened. The "Start" side of the starter A–B supplies maximum line voltage to the stator windings W of the winder motor 40. The 2Y–"Start" side of the multi-speed starter C–D connects the stator winding W of the motor 40 in a double-star arrangement D–S for maximum torque as is best shown in FIG. 6.

The circuit breakers before identified are all operated on a selected time delay basis. At a predetermined time after the CB–1 and CB–3 are closed, generally anywhere from 10 to 60 seconds, the circuit breakers CB–2 and CB-4 are simultaneously energized or are closed and CB-1 and CB-3 de-energized or opened. This action energizes the "Run" sides of the two starters A-B and C-D.

The "Run" side of the starter A-B contains a power varying means V, such as a "Variac," to supply a reduced, variable input voltage for the motor windings W. The means V is shown as including windings H1, H2 and H3 with slideable contact arms C1, C2 and C3 respectively.

The 1Y "Run" side of the multi-speed starter C-D connects the field windings W of the motor 40 or 40′ in a single-star arrangement SS, as is best shown in FIG. 7, for operational torques. Thus, the operational torque level of the constant torque motor is selected and set by adjusting the means V after the motor is brought to its operational speed. Once a set torque-level has been determined, it is no longer necessary to adjust the "Variac" V for subsequent runs.

Generally speaking, a motor having constant horsepower characteristics does not require a special start-up circuit to bring the motor up to operational speeds since the start-up torque developed in the running windings is sufficient when the slip is equal to 1.0, i.e., when the motor has not yet started. In certain cases, however, a higher start-up torque may be required, and in such a case, the circuitry of FIGS. 5, 6 and 7 can be employed.

The following illustrates differences in the process conditions and properties of the strand in forming packages produced according to the present invention utilizing a substantially constant horsepower motor as the collet driving means as compared to those produced by a conventional prior art process. Conventional "E" glass having a density of 2.5 grams per cc. was employed in both processes.

Model No. DXX40, which is distributed by the Electromatic Equipment Company of Brooklyn, New York.

Prior methods of winding fiber glass strands produce forming packages in which the strand, as it is being wound onto the forming tube, has about 250 to 350 grams of tension. These high tensions limit the amount of fiber glass strand that can be wound upon a winding tube, require a large diameter winding tube, and most importantly are likely to collapse and distort the wound strand resulting in objectionable and therefore wasted fiber glass strand as well as impairment to the quality of the usable strand. Packages prepared according to the teachings of the instant invention have been produced in which the strand, as it is wound into a forming package, has a measured tension of from about 30 to 200 grams. These reduced tensions permit the production of a much larger package than heretofore attainable, permit the use of a much smaller diameter forming tube and its attendant advantages, eliminate the possibility of collapsing or distorting the strand, eliminate the need for a collapsible collet, reduce the possibility of strand breakage, permit the storage of the maximum amount of fiber glass strand in a given area, and provide a shippable forming package. The novel forming packages also permit easier fabrication such as by conventional uptwisting rather than downtwisting methods.

If a uniformly tensioned strand is desired on the package, a constant horsepower take-up motor is used and is adjusted to take-up the strand at a tension within the range of approximately 30 to 200 grams of tension, as tensions within this range have been found to be the most practical from a production standpoint. A uniform tension in the strand is desirable in order to obtain high quality products in formation and in further fabrication

| Process Conditions and Property of Forming Package | Present Invention | Prior Art Process |
| --- | --- | --- |
| Number of filaments in strand | 400 | 400. |
| Filament diameter (inches) | 0.00027 | 0.00027. |
| Size | Starch-oil | Starch-oil. |
| Percent solids of size forming package | 1.7 | 1.7. |
| Percent moisture in package | 9½ | 9¾. |
| Bushing temperature (° F.) | About 2,250° F. throughout forming run. | 2,250° F. at start of run changing linearly to 2,270° F. at end of run. |
| Traverse | Cylindrical, helical cam | Two conical, spiral wire cams on shaft (U.S. 2,391,870). |
| Forming package build | Flat-sided as shown in Fig. 1 | Barrel-shaped as shown in U.S. 2,391,870. |
| Traverse speed (revolutions per minute, 1 cycle per revolution) | 15,000 | 2,100. |
| Traverse throw (inches) | ¾ | 3. |
| Capstan (2¼ inch diameter) speed (revolutions per minute) | 14,400 | |
| Outside diameter of forming tube (inches) | 3⅛ | 6⅜. |
| Approximate collet speed (revolutions per minute) | Start 11,500 / Finish 6,500 | 7,000. |
| Collet reciprocating speed (inches per minute) | 90 | |
| Pounds of strand in package | 10 | 4.2. |
| Outside diameter of package (inches) | 5½ | 7¼. |
| Approximate thickness of package (inches) | 1¼ | ⅞₆. |
| Length of package (inches) | 10 | 10. |
| Approximate storage space required for strand forming package (cubic inches per pound of strand) | 22 | 100. |
| Tension in strand just prior to wrapping on forming tube (grams) | About 50 throughout forming run. | Start-end 250-260. |
| Hardness of package (Shore A durometer test) | 50 | 70. |
| Density of forming package after setting for 45 days, assuming equal moisture content | 0.18 pounds per cubic inch | 0.20 pounds per cubic inch |
| Short-term yardage variation (percent) (2 yard cycles) | ±1 | ±7. |
| Long-term yardage variations (percent) | Less than ±0.7 | ±1.8. |
| Variation in mean yardage (Diameter) from package to package (percent) | ±0.9 | ±2½. |

The prior art package was incapable of being depressed by a manual force while the package wound in accordance with the present invention is easily depressed by slight pressure exerted by the holder's thumb.

The hardness measurements were made with a Shore durometer Scale A hardness tester. The tension measurements were made with a Schmidt-Esslingen Tensometer, of the strand. In this range of tension the strand on the forming package is sufficiently tight so that the strand retains its package form during subsequent handling operation while at the same time is loose enough not to cause the exertion of any damaging constricting forces from the upper layers of strand upon the lower layers of fiber glass strand and not cause damage to the individual filaments as the strand is unwound from the forming package. If less than 30 grams of tension is exerted on the strand, there is a tendency for the strand to lick or wrap around the capstan, and therefore higher tensions of the order of 45 to 60 grams are preferred for this reason. Slightly higher tensions, i.e. of the order of 60 to 140 grams may be preferred if there is any tendency for the strand to slip on the capstan. A practical upper limit of tension to be applied to the strand may be governed by the difficulty which might be encountered in conditioning or drying the moisture content prior to twisting the strand, it being found that it is more difficult to dry the strand package when it is wound with tensions of the order of 200 grams being applied to the strand as it is wound on the tube.

The most practical gradually decreasing tension strand is attained by adjusting a constant torque motor to start the winding operation at approximately 120 grams of tension. Thus, when a 3-inch diameter collet is used in forming a glass strand package having an ultimate O.D. of 6 inches, the tension in the strand gradually decreases to 60 grams of tension in that portion of the strand on the outer layer. This is the case since the tension in the strand will vary inversely to an increase in the torque arm of the motor as represented by the increase in the radius of the formed package.

The use of forming tubes of smaller diameter as provided by the present invention permits the winding stations to be located closer together and this permits increased production capacity per given amount of factory space. A solid collet, rather than a collapsible collet, can be used and this permits higher winding speeds and better balance of the winder to be obtained. The smaller diameter forming tubes are less expensive, and they are dimensionally more stable thereby permitting ease of handling in subsequent fabrication steps.

Experience has shown that operating conditions are slightly different for each bushing, various sized bushings, various bushing tip sizes, various diameters and numbers of glass fibers in the strand and various drawing speeds. Therefore, the exact setting of the take-up motor to give a particular result requires merely individual adjustment and setting for each fiber forming station.

What is claimed is:
1. A method of producing continuous glass fiber strand which comprises,
 (a) withdrawing glass fibers from a pool of molten glass,
 (b) moving said glass fibers over and in contact with the curved surface of a rotating cylindrical member connected to the drive shaft of a constant-speed motor, said rotating member being at a first location spaced from the location of said fiber withdrawal,
 (c) operating said constant-speed motor to apply a substantially constant withdrawal force on said fibers to withdraw the fibers at a substantially constant linear rate of speed,
 (d) thereafter at a second location spaced from the first location and the location of fiber withdrawal, laying said fibers in a plurality of layers on a rotating tubular surface connected to the drive shaft of a constant torque electric motor, thereby progressively increasing the distance between the axis of said rotating tubular surface and the outermost layer of fibers laid thereon,
 (e) operating said constant-torque motor to apply a second force on said fibers of less magnitude than said withdrawal force to exert a tension in the fibers throughout the length thereof between the first and second locations, said tension being positive and less than that exerted by said withdrawal force between the pool of molten glass and the said first location,
 (f) driving said constant-torque motor at a constant input voltage to decrease said second force progressively in direct proportion to the increase in distance between the axis of said rotating tubular surface and the outermost layer of fibers, whereby the product of said second force and said distance is maintained substantially constant as said second force and said distance vary.

2. A method of producing continuous glass fiber strand which comprises,
 (a) withdrawing glass fibers from a pool of molten glass,
 (b) moving said glass fibers over and in contact with the curved surface of a rotating cylindrical member connected to the drive shaft of a constant-speed motor, said rotating member being at a first location spaced from the location of said fiber withdrawal,
 (c) operating said constant-speed motor to apply a substantially constant withdrawal force on said fibers to withdraw the fibers at a substantiallly constant linear rate of speed,
 (d) thereafter at a second location spaced from the first location and the location of fiber withdrawal laying said fibers in a plurality of layers on a rotating tubular surface connected to the drive shaft of a constant-horsepower induction motor, thereby progressively increasing the distance between the axis of said rotating tubular surface and the outermost layer of fibers laid thereon,
 (e) operating said constant-horsepower induction motor to apply a second force on said fibers of less magnitude than said withdrawal force to exert a tension in the fibers throughout the length thereof between the first and second locations, said tension being positive and less than that exerted by said withdrawal force between the pool of molten glass and the said first location,
 (f) driving said constant-horsepower induction motor at a constant input voltage and in a constant magnetic field to decrease the rotational speed of said rotating tubular surface progressively and in direct proportion to the increase in distance between the axis of said rotating tubular surface and the outermost layer of fibers, while the tension in said fibers exerted by said second force remains positive and constant, whereby the product of said rotational speed of said rotating tubular surface and said distance is maintained substantially constant as said rotational speed and said distance vary.

References Cited by the Examiner

UNITED STATES PATENTS

| | | | |
|---|---|---|---|
| 2,287,557 | 6/1942 | Modigliani | 18—8 |
| 2,353,408 | 7/1944 | Larson | 318—6 X |
| 2,398,808 | 4/1946 | Slayter et al. | 18—8 |
| 2,459,064 | 1/1949 | Davis | 318—6 |
| 2,482,071 | 9/1949 | Simison | 18—54 |
| 2,495,956 | 1/1950 | Cook | 65—2 |
| 2,699,415 | 1/1955 | Nachtman | 18—8 |
| 2,702,167 | 2/1955 | Biggs et al. | 242—172 |
| 2,786,637 | 3/1957 | Russell et al. | 242—18 |
| 2,800,290 | 7/1957 | Hess | 242—165 |
| 2,896,140 | 7/1959 | Fuge | 318—6 |
| 2,915,254 | 12/1959 | Weber et al. | 242—45 |
| 2,950,067 | 8/1960 | Keith | 242—45 |
| 3,019,078 | 1/1962 | Roberson | 18—54 |
| 3,022,020 | 2/1962 | Higgins. | |
| 3,060,357 | 10/1962 | Lohest | 242—45 X |
| 3,082,361 | 3/1963 | Lohest | 318—6 |
| 3,090,571 | 5/1963 | Lohest et al. | 242—45 |
| 3,193,209 | 7/1965 | Hambach | 242—18 |

DONALL H. SYLVESTER, *Primary Examiner.*

MICHAEL V. BRINDISI, *Examiner.*

L. D. RUTLEDGE, F. W. MIGA, *Assistant Examiners.*